United States Patent [19]
Zeeh et al.

[11] 3,884,670
[45] May 20, 1975

[54] PLANT GROWTH REGULATORS

[75] Inventors: Bernd Zeeh, Ludwigshafen; Johann Jung, Limburgerhof; Hans Joachim Pander, Rodersheim-Gronau, all of Germany

[73] Assignee: Badische Anilin- & Soda-Fabrik Aktiengesellschaft, Ludwigshafen (Rhine), Germany

[22] Filed: Oct. 13, 1972

[21] Appl. No.: 297,364

[30] Foreign Application Priority Data
Oct. 28, 1971  Germany............................ 2153600

[52] U.S. Cl...................................... 71/76; 71/121
[51] Int. Cl............................................... A01n 9/20
[58] Field of Search................................ 71/121, 76

[56]  References Cited
UNITED STATES PATENTS

| | | | |
|---|---|---|---|
| 3,467,712 | 9/1969 | Jung et al. | 260/583 |
| 3,497,343 | 2/1970 | Jung et al. | 71/76 |
| 3,580,716 | 5/1971 | Mussell et al. | 71/76 |
| 3,683,026 | 8/1972 | Koenig | 71/121 |

*Primary Examiner*—Lewis Gotts
*Assistant Examiner*—Catherine L. Mills
*Attorney, Agent, or Firm*—Johnston, Keil, Thompson & Shurtleff

[57]  ABSTRACT

Plant growth regulators containing as active ingredients nitrogenous onium compounds and the use of these compounds for regulating plant growth.

13 Claims, No Drawings

PLANT GROWTH REGULATORS

It is known to use nitrogenous compounds such as chlorocholine chloride (CCC) (J. Biol. Chem., 235, 475, 1960) and 1-(β-chloroethyl)-1, 1-dimethylhydrazinium chloride (CMH) (Naturwissenschaften, 55, 217, 1968) for influencing the growth of plants. These compounds have an effect on the physiology of plant growth and may therefore be employed as plant growth regulators.

One of the typical effects of plant growth regulators is a reduction or increase in plant height. Similarly, seed germination may be stimulated or flowering induced, i.e., it is possible to influence the plant's natural rhythm. Plant growth regulators can also promote or inhibit tillering.

Of economic interest is for example the minimization of lodging in cereals, the slowing down of grass growth on verges and lawns, thus reducing mowing frequency.

When prior art plant growth regulators are used for instance on cereals to compact the plant stem to reduce lodging, their action is often completely unsatisfactory.

We have now found that compounds of the formula $$\left[ R^1-\overset{R^2}{\underset{CH_3}{N^\oplus}}-CH_3 \right] X^\ominus ,$$

where $R^1$ denotes a cycloalkyl or cycloalkenyl radical having 3 to 5 ring members and which may be substituted by alkyl (methyl, ethyl, propyl, isopropyl), $R^2$ denotes methyl or amino, and X denotes the anion of an inorganic or organic acid, cause a reduction in or stunt the growth height of numerous plants. This action is particularly in evidence in cereals, e.g., wheat, rye, barley and oats; dicotyledons, e.g., potatoes, tomatoes, vines and cotton; and various ornamentals, poinsettia and hibiscus. The treated plants exhibit a compact habit and darker leaf coloration.

The activity of the compounds is attributable to the cation, so that practically any anion may be used. However, anions of phytotoxic acids should not be employed if the intention is only to influence plant growth and not to kill the plants. Examples of suitable acids are hydrochloric acid, hydrobromic acid, sulfuric acid, carbonic acid, nitric acid, phosphoric acid, acetic acid, propionic acid, benzoic acid, monomethyl and momoethyl ester of sulfuric acid, 2-ethylhexanoic acid, acrylic acid, maleic acid, succinic acid, adipic acid, formic acid, chloroacetic acid, p-toluenesulfonic acid, and benzenesulfonic acid.

The compounds may be applied to the plants through the host soil, i.e., are taken up through the roots, or by spraying the plant leaves. In addition to soil and foliage application, the seed may be treated. As a result of the comparatively good crop plant compatibility, the application rate may vary considerably, rising for instance up to 15 kg of active ingredient per hectare. However, rates of 0.5 to 8 kg/ha are normally sufficient.

The compounds may be prepared by various methods. Generally, the starting material will be a trimethylamine or a 1,1-dimethylhydrazine which is quaternized with a cycloalkyl or cycloalkenyl halide, for instance in accordance with the following equation:

$$R^1-X + (CH_3)_2NR^2 \longrightarrow \left[ R^1-\overset{R^2}{\underset{CH_3}{N^\oplus}}-CH_3 \right] X^\ominus$$

$R^1$ and $R^2$ having the above meanings, X denoting a halogen atom and $X^-$denoting a halogen anion. The preparation of some of the active ingredients according to the invention is described below.

EXAMPLE 1

At room temperature (20°C), gaseous trimethylamine is passed into a solution of 69 parts (by weight) of 3-chlorocyclopentene-(1) in 50 parts of acetonitrile until it is saturated. The precipitate which forms is suction filtered, dissolved in isopropanol and reprecipitated with absolute ether. There is obtained 41 parts of trimethylcyclopenten-(1)-yl-(3)-ammonium chloride which decomposes at 223°C.

Analysis: $C_8H_{16}CiN$ (161.68)

| | | | |
|---|---|---|---|
| Calc.: | C 59.49% | H 9.98% | Cl 21.93% |
| found: | C 59.2% | H 9.8% | Cl 22.7%. |

EXAMPLE 2

69 parts of 3-chlorocyclopentene-(1) is dissolved in 20 parts of acetonitrile. With ice cooling and while stirring, a solution of 30 parts of 1, 1-dimethylhydrazine in 20 parts of acentonitrile is allowed to drip in. After 1 hour the precipitate which has formed is suction filtered, dissolved in 100 parts of isopropanol and reprecipitated with absolute ether. There is obtained 42 parts of 1, 1-dimethyl-1-[cyclopenten-(1)-yl-(3)]-hydrazinium chloride which decomposes at 138°C.

Analysis: $C_7H_{15}CiN_2$ (162.66)

| | | | | |
|---|---|---|---|---|
| Calc.: | C 51.68% | H 9.29% | Cl 21.80% | N 17.24% |
| found: | C 51.4% | H 9.4% | Cl 21.8% | N 17.4%. |

The following table contains further examples of the active ingredients according to the invention.

$$\left[ R^1-\overset{R^2}{\underset{CH_3}{N^\oplus}}-CH_3 \right] X^\ominus$$

| $R^1$ | $R^2$ | X | m.p. (°C)˙ |
|---|---|---|---|
| cyclopropyl | $CH_3$ | Cl | about 180 (decomposes) |
| cyclopropyl | $CH_3$ | Br | 287 (decomposes) |
| methylcyclobutyl | $CH_3$ | Br | 271 (decomposes) |
| cyclopentyl | $CH_3$ | Cl | 253 (decomposes) |
| cyclopentyl | $NH_2$ | Br | 174 (decomposes) |
| cyclobutyl | $CH_3$ | I | 256 to 257 (decomposes) |
| cyclopentenyl | $CH_3$ | I | 181 to 182 |

The agents according to the invention may be used as solutions, emulsions, suspensions, granules or dusts. The form of application depends entirely on the purpose for which the agents are being used; in any case it should ensure a fine distribution of the active ingredient.

For the preparation of solutions to be sprayed direct, solution in water is suitable. However, dispersions in hydrocarbons having boiling points higher than 150°C, e.g., tetrahydronaphthalene or alkylated naphthalenes, or organic liquids having boiling points higher than 150°C and having one or more than one functional group, e.g., the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possible solvent.

Dusts may be prepared by mixing or grinding the active ingredients with a solid carrier, e.g., kieselguhr, talc, clay or fertilizers. If the agents of the invention are used as granules, it is preferred to mix them with fertilizers.

The biological action of trimethylcyclopenten-(1)-yl-(3)-ammonium chloride (I) and 1,1-dimethyl-1-[cyclopenten-(1)-yl-(3)]-hydrazinium chloride (II) is demonstrated in the following examples.

EXAMPLE 3

Under greenhouse conditions, oat seeds were sown in loamy sandy soil in Neubauer dishes. Shortly after sowing, 3 and 12 mg of each active ingredient in aqueous solution was added to the dishes; the prior art compound CCC (chlorocholine chloride) was used for comparison purposes.

The height of the plants was measured 27 days after treatment; the figures obtained are given in the following table:

| Active ingredient | | Growth height | |
|---|---|---|---|
| | | cm | relative |
| untreated | | 22.3 | 100% |
| CCC | 3 mg/dish | 22.0 | 98.7% |
| | 12 mg/dish | 20.0 | 89.7% |
| I | 3 mg/dish | 21.0 | 94.2% |
| | 12 mg/dish | 19.5 | 87.4% |
| II | 3 mg/dish | 21.0 | 94.2% |
| | 12 mg/dish | 19.0 | 85.2% |

In addition to causing a considerable reduction in growth height, active ingredients I and II also colored the foliage a deep green.

EXAMPLE 4

Cut pieces of pre-sprouted potatoes were planted in loamy sandy soil in Neubauer dishes and after the pieces had rooted the plants were sprayed at a growth height of approx. 7 cm with amounts of active ingredient corresponding to 6 kg/ha in aqueous solution. CCC was used as comparative agent. Only a few days after treatment, the potato plants exhibited compact growth, increased stem diameter and darker colored foliage. The effect of active ingredients I and II was much more marked than that of CCC.

| Active ingredient | | Growth height (36 days after treatment) | |
|---|---|---|---|
| | | cm | relative |
| untreated | | 18.0 | 100% |
| CCC | 6 kg/ha | 17.0 | 94.4% |
| I | 6 kg/ha | 12.0 | 66.7% |
| II | 6 kg/ha | 14.5 | 80.6% |

EXAMPLE 5

Poinsettias of the "Impromptu" variety were raised in pots having a diameter of 12 cm; the soil was then sprayed at a growth height of the plants of approx. 20 cm with 300 mg of CCC and 300 mg of I, both in aqueous solution.

The plants' reaction to treatment was manifested in shortened growth height and a reduction in internodal distance. The height of the plants was measured one month after treatment; the results obtained are given in the following table:

| Active ingredient | | Growth height | |
|---|---|---|---|
| | | cm | relative |
| untreated | | 74 | 100% |
| CCC | 300 mg/pot | 48 | 64.8% |
| I | 300 mg/pot | 34 | 45.9% |

In addition to causing a greater reduction in height, I also resulted in a darker foliage coloration.

EXAMPLE 6

The foliage of tobacco of the "Badischer Burley" variety raised in pots having a diameter of 12 cm was treated, at a growth height of the plants of approx. 20 cm, with aqueous solutions of the active ingredients corresponding to application rates of 0.75 and 3 kg/ha.

The height of the plants was measured 50 days after treatment; the following figures show that I and II have an action far superior to that of CCC and CMH (1,1-dimethyl-1-(2-chloroethyl)-hydrazinium chloride):

| Active ingredient | | Growth height | |
|---|---|---|---|
| | | cm | relative |
| untreated | | 70.0 | 100% |
| CCC | 0.75 kg/ha | 67.3 | 96.1% |
| | 3.00 kg/ha | 70.0 | 100% |
| CMH | 0.75 kg/ha | 67.3 | 96.1% |
| | 3.00 kg/ha | 67.6 | 96.6% |
| I | 0.75 kg/ha | 64.6 | 92.3% |
| | 3.00 kg/ha | 65.3 | 93.3% |
| II | 0.75 kg/ha | 65.3 | 93.3% |
| | 3.00 kg/ha | 64.6 | 92.3% |

EXAMPLE 7

CCC and I were applied in aqueous solution to the foliage of cotton and the soil in which the cotton plants were growing. The soil was treated immediately after sowing, the foliage after formation of the first pair of leaves. The amount of active ingredient applied to each dish was 3 mg. The plants were measured two months after treatment and the following figures were obtained:

| Active ingredient | A) Soil treatment Growth height | | B) Foliage treatment | |
|---|---|---|---|---|
| | cm | relative | cm | relative |
| untreated | 17.0 | 100% | 17.0 | 100% |
| CCC | 11.0+) | 64.7% | 11.0+) | 64.7% |
| I | 9.5 | 55.9% | 10.0 | 58.8% |

+) chlorosis at leaf periphery

Of particular significance in this experiment is the fact that the CCC applications, both in the soil and foliage treatment methods, caused chlorosis (etiolation), whereas this phenomenon was not observed after treatment with I.

EXAMPLE 8

Peas (variety "Ueberreich") were cultivated in Neubauer dishes and treated with I, II and the prior art plant growth regulator gibberellic acis. After foliage treatment in concentrations appropriate for the various active ingredients, the plants exhibited different developments. Gibberellic acid was employed at a rate of 0.5 kg/ha because it develops its full action at lower dosage rates, whereas I and II were used at 6 kg/ha as they only reveal their action at these rates.

Whereas the gibberellic acid treatment resulted in a considerable increase in growth height, the plants treated with I and II exhibited particularly sturdy tillers and foliage, with unchanged height. The green weight, determined 3 weeks after treatment, shows that treatment with the compounds of the invention results in a considerable increase in yield:

| Active ingredient | | Growth height | | Green weight | |
|---|---|---|---|---|---|
| | | cm | relative | g | relative |
| untreated | | 27 | 100% | 7.18 | 100% |
| gibberellic acid | 0.5 kg/ha | 42 | 156% | 7.65 | 107% |
| I | 6 kg/ha | 26.5 | 98% | 8.60 | 120% |
| II | 6 kg/ha | 27 | 100% | 8.95 | 125% |

EXAMPLE 9

Wheat (variety "Opal") cultivated in Neubauer dishes was treated immediately after sowing by spraying the soil surface with 12 mg per dish (corresponding to 12 kg/ha) of the following active ingredients. CMH, N-trimethyl-N-cyclopropylammonium chloride (III), and N-trimethyl-N-[1-methylcyclobutyl-(1)]-ammonium bromide (IV). The height of the plants was measured after 15 days; the figures obtained are given in the following table:

| Active ingredient | mg/dish | Growth height | |
|---|---|---|---|
| | | cm | relative |
| untreated | — | 33.8 | 100% |
| CMH | 12 | 26.0 | 77% |
| III | 12 | 24.0 | 71% |
| IV | 12 | 24.5 | 72% |

These figures show that III and IV caused a most marked reduction in growth height (far greater than that caused by CMH).

EXAMPLE 10

90 parts by weight of compound I is mixed with 10 parts by weight of N-methyl-α-pyrrolidone. A mixture is obtained which is suitable for application in the form of very fine drops.

EXAMPLE 11

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 12

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide of 1 mole of castor oil. By pouring the solution into 100,000 parts by weight of water and uniformly distributing it therein, an aqueous dispersion is obtained containing 0.02 percent by weight of the active ingredient.

EXAMPLE 13

20 parts by weight of compound I is dissolved in a mixture consisting of 25 parts by weight of cyclohexanol, 65 parts by weight of a mineral oil fraction having a boiling point between 210° and 208°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 14

20 parts by weight of compound II is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 15

3 parts by weight of compound III is intimately mixed with 97 parts by weight of particulate kaolin. A dust is obtained containing 3 percent by weight of the active ingredient.

EXAMPLE 16

30 parts by weight of compound I is intimately mixed with a mixture consisting of 92 parts by weight of powdered silica gel and 8 parts by weight of paraffin oil

We claim:

1. A process for stunting the growth height of plants which comprises applying to the loci of the plants an effective amount for effecting said stunting of a salt of the formula

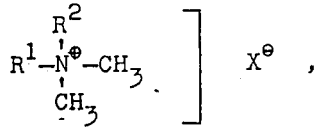

where $R^1$ denotes a cycloalkyl or cycloalkenyl radical having 3 to 5 ring members and which may be substituted by alkyl, $R^2$ denotes methyl or amino, and $X^-$ denotes a halogen anion.

2. A process as claimed in claim 1 wherein the salt is used in an amount of from 0.5 to 8 kg per hectare.

3. A process for stunting the growth height of plants which comprises applying to the loci of the plants an effective amount for effecting said stunting of trimethylcyclopenten-(1)-yl-(3)-ammonium chloride.

4. A process for stunting the growth height of plants which comprises applying to the loci of the plants an effective amount for effecting said stunting of 1,1-dimethyl-1-[cyclopenten-(1)-yl-(3)]-hydrazinium chloride.

5. A process as claimed in claim 4 wherein said plants are cereals.

6. A process as claimed in claim 3 wherein said plants are cereals.

7. A process as claimed in claim 1 wherein said plants are cereals.

8. A process as claimed in claim 4 wherein said plants are cotton.

9. A process as claimed in claim 3 wherein said plants are cotton.

10. A process as claimed in claim 1 wherein said plants are cotton.

11. A process as claimed in claim 1 wherein said salt is applied to said loci of said plants by foliar application thereof.

12. A process as claimed in claim 1 wherein said salt is applied to said loci of said plants by addition thereof to the host soil of said plants.

13. A process as claimed in claim 1 wherein said salt is applied to said loci of said plants by application thereof to the seeds of said plants.

* * * * *

UNITED STATES PATENT AND TRADEMARK OFFICE
CERTIFICATE OF CORRECTION

PATENT NO. : 3,884,670
DATED : May 20, 1975
INVENTOR(S) : ZEEH et al

It is certified that error appears in the above-identified patent and that said Letters Patent are hereby corrected as shown below:

In the Heading, [30] delete "2153600" and insert --2153660--

In Column 2, Line 47, delete "$C_7H_{15}CiN_2$" and insert --$C_7H_{15}ClN_2$--

Signed and Sealed this fourth Day of May 1976

[SEAL]

Attest:

RUTH C. MASON
Attesting Officer

C. MARSHALL DANN
Commissioner of Patents and Trademarks